United States Patent
Simanovski et al.

(10) Patent No.: US 9,653,867 B2
(45) Date of Patent: May 16, 2017

(54) MULTI-WAVELENGTH SOURCE OF FEMTOSECOND INFRARED PULSES

(71) Applicant: Coherent, Inc., Santa Clara, CA (US)

(72) Inventors: Dmitri Simanovski, Palo Alto, CA (US); Norman Hodgson, Belmont, CA (US)

(73) Assignee: Coherent, Inc., Santa Clara, CA (US)

( * ) Notice: Subject to any disclaimer, the term of this patent is extended or adjusted under 35 U.S.C. 154(b) by 524 days.

(21) Appl. No.: 14/245,913

(22) Filed: Apr. 4, 2014

(65) Prior Publication Data
US 2016/0294145 A1    Oct. 6, 2016

(51) Int. Cl.
| | |
|---|---|
| H01S 3/00 | (2006.01) |
| H01S 3/16 | (2006.01) |
| H01S 3/067 | (2006.01) |
| G02B 27/10 | (2006.01) |
| G02B 27/42 | (2006.01) |
| H01S 3/23 | (2006.01) |
| G01J 3/14 | (2006.01) |

(Continued)

(52) U.S. Cl.
CPC ........ *H01S 3/0057* (2013.01); *G02B 27/1006* (2013.01); *G02B 27/4244* (2013.01); *H01S 3/0078* (2013.01); *H01S 3/0092* (2013.01); *H01S 3/06758* (2013.01); *H01S 3/1618* (2013.01); *H01S 3/2308* (2013.01); *G01J 3/14* (2013.01); *G01J 3/18* (2013.01); *G02F 1/353* (2013.01); *G02F 1/365* (2013.01); *G02F 2001/3528* (2013.01); *G02F 2203/055* (2013.01); *G02F 2203/255* (2013.01); *G02F 2203/58* (2013.01); *H01S 3/005* (2013.01); *H01S 2301/08* (2013.01)

(58) Field of Classification Search
None
See application file for complete search history.

(56) References Cited

U.S. PATENT DOCUMENTS

| | | | |
|---|---|---|---|
| 6,236,779 B1 | 5/2001 | Kafka et al. | |
| 6,603,600 B2 | 8/2003 | Pang | |

(Continued)

FOREIGN PATENT DOCUMENTS

| | | |
|---|---|---|
| JP | 10070328 A | 3/1998 |
| WO | 2008/089342 A1 | 7/2008 |

(Continued)

OTHER PUBLICATIONS

International Search Report and Written Opinion received for PCT Patent Application No. PCT/US2015/022573, mailed on Jul. 2, 2015, 13 pages.

(Continued)

*Primary Examiner* — Armando Rodriguez
(74) *Attorney, Agent, or Firm* — Morrison & Foerster LLP

(57) ABSTRACT

A source of femtosecond pulses at center wavelengths of about 940 nm and about 1140 nanometers (nm) includes a mode-locked fiber MOPA delivering pulses having a center wavelength of about 1040 nm. The 1040-nanometer pulses are spectrally spread into a continuum spectrum extending in range between about 900 nm and about 1200 nm and having well defined side-lobes around the 940-nm and 1140-wavelengths. Radiation is spatially selected from these side-lobes and delivered as the 940-nm and 1140-nm pulses.

19 Claims, 10 Drawing Sheets

(51) Int. Cl.
*G01J 3/18* (2006.01)
*G02F 1/35* (2006.01)
*G02F 1/365* (2006.01)

(56) References Cited

U.S. PATENT DOCUMENTS

| | | |
|---|---|---|
| 6,611,643 B2 | 8/2003 | Birk et al. |
| 6,710,918 B2 | 3/2004 | Birk et al. |
| 7,597,619 B2 | 10/2009 | Crivelli et al. |
| 7,826,499 B2 | 11/2010 | Nicholson et al. |
| 8,478,134 B2 | 7/2013 | Nicholson et al. |
| 2006/0237666 A1 | 10/2006 | Kubo |
| 2008/0089366 A1 | 4/2008 | Liu |
| 2009/0225794 A1 | 9/2009 | Liu |
| 2012/0281720 A1* | 11/2012 | Fermann ............... H01S 3/0675 372/6 |

FOREIGN PATENT DOCUMENTS

| | | |
|---|---|---|
| WO | WO 2008/089342 * | 7/2008 |
| WO | 2013/039668 A1 | 3/2013 |

OTHER PUBLICATIONS

Chen et al., "35 W High Power All Fiber Supercontinuum Generation in PCF with Picosecond MOPA Laser", Optics Communications, vol. 284, pp. 5484-5487.

Yan et al., "High-Power Yb-Fiber Comb with Feed-Forward Control of Nonlinear-Polarization-Rotation Mode-Locking and Largewmode-Area Fiber Amplification", Optics Letters, vol. 37, No. 9, May 1, 2012, pp. 1511-1513.

Resan et al., "Low Cost Laser System Generating 26 fs Pulse Duration, 30 kW Peak Power, and Tunability from 800 to 1200 nm for Multiphoton Microscopy", Proc. of SPIE vol. 8226, 2012, pp. 82262Y-1-82262Y-5.

* cited by examiner

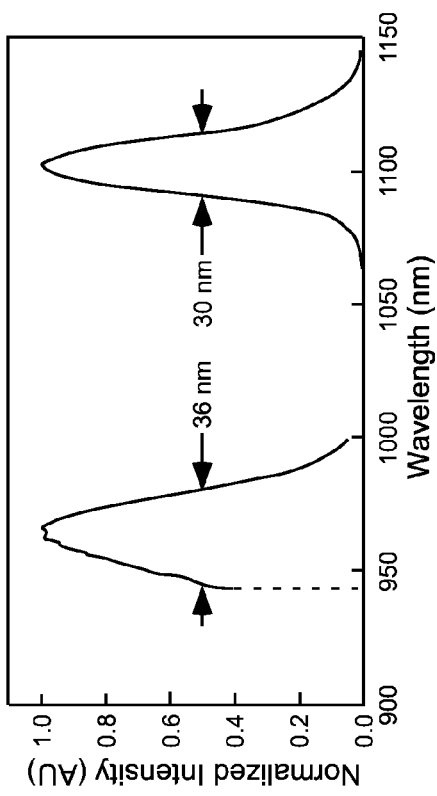
FIG. 9
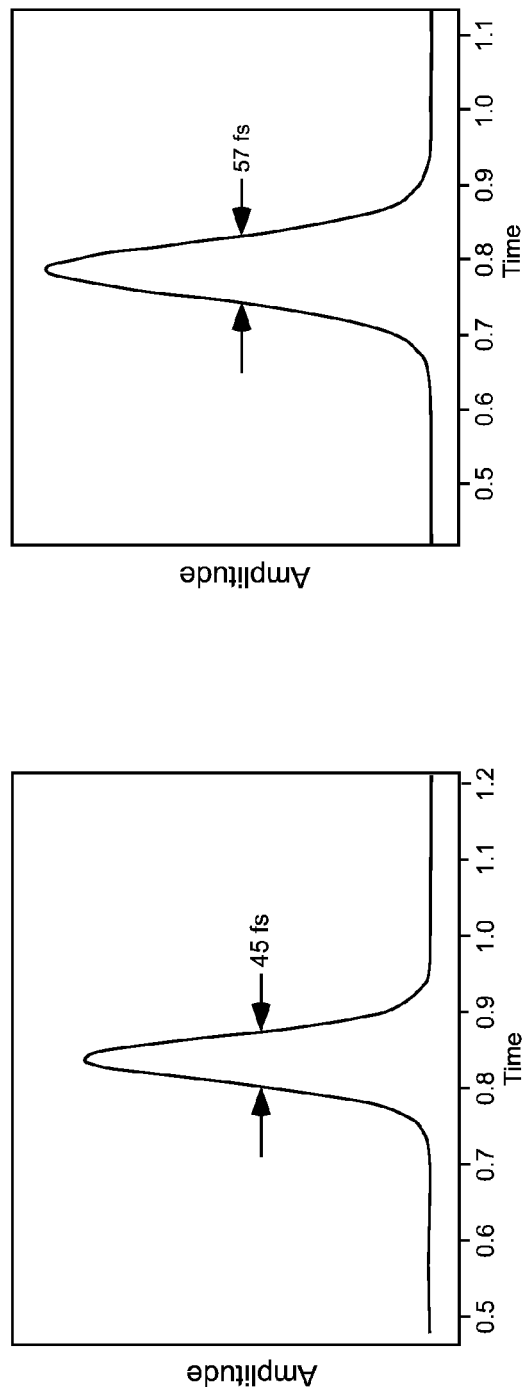
FIG. 10A
FIG. 10B

US 9,653,867 B2

MULTI-WAVELENGTH SOURCE OF FEMTOSECOND INFRARED PULSES

TECHNICAL FIELD OF THE INVENTION

The present invention relates in general to tunable sources of femtosecond (fs) laser pulses. The invention relates in particular to sources of femtosecond laser pulses tunable at infrared wavelengths greater than 900 nanometers (nm).

DISCUSSION OF BACKGROUND ART

A common application of tunable sources of femtosecond laser-pulses (laser-radiation pulses having a pulse-duration from a few femtoseconds to a few tens of femtoseconds) is in multi-photon excitation (MPE) of analysis samples in microscopy and spectrometry. The most commonly used such sources are so-called ultrafast lasers employing solid-state gain-media with a relatively very broad gain-bandwidth. The most common such gain medium is titanium-doped sapphire (Ti:sapphire), which has a FWHM gain-bandwidth extending from about 700 nanometers (nm) to about 900 nm. Laser oscillation can be achieved over a wavelength range between about 650 nm and 1080 nm, but with noticeably lower power, for example less than 1 Watt (W) at wavelengths greater than 1000 nm and less than 700 nm. There are other broad-band gain-media operable in about the same wavelength range, such as alexandrite, chromium-doped lithium strontium aluminum fluoride (Cr:LISAF), and chromium-doped lithium calcium aluminum fluoride (Cr:LICAF). The term "vibronic" gain-media is often used by practitioners of the art for such broad-band gain-media.

Ultrafast laser sources employing vibronic gain-media are relatively expensive compared with other pulsed solid-state lasers of equivalent power. This is due to the fact that the gain media are pumped by expensive visible (frequency converted) CW lasers. In addition, the wide tuning range requires complicated resonator designs to control the emission wavelength and compensate for group-delay dispersion.

Pulse wavelengths suitable for MPE are not restricted to the 700-nm to 900-nm (FWHM) wavelength range of the vibronic gain-media, but can extend further into the near infrared (NIR) region of the electromagnetic spectrum, where several fluorophores (fluorescent markers) can be excited by two-photon (2P) absorption. These include green fluorescent protein, such as EGFP; red fluorescent protein, such as mCherry; chimeric opsins, such as channel rhodopsin ChR2, and C1V1; and calcium signal fluorophores, such as GCaMP3 and RCaMP1. Suitable 2-photon excitation wavelengths range from 900 nm for EGFP to 1110 nm for RCaMP. In each case, the absorption band of the fluorophore is sufficiently wide that there is a tolerance of about ±30 nm or greater around a nominal peak within which the fluorophore can be effectively excited.

In certain cases, it could be advantageous in an analysis if two or more fluorophores were used, and simultaneously excited by two or more corresponding wavelengths. The term "simultaneously", here, meaning, for example, within the response time of a human eye or a CCD.

Pulses having wavelengths in the above-discussed NIR range can be provided (tunably) by using an ultrafast laser or MOPA to pump an optical parametric oscillator (OPO). This, however, adds another layer of cost and complexity to the laser. Further, only one of the wavelengths can be generated at any one time.

There is a need for a relatively inexpensive source of femtosecond laser pulses for MPE that can directly generate NIR laser pulses at different wavelengths. Preferably, the laser pulse-source should be capable of generating pulses at two or more NIR wavelengths simultaneously, with at least limited tunability, for selecting the wavelengths.

SUMMARY OF THE INVENTION

In one aspect, optical apparatus in accordance with the present invention comprises a mode-locked ytterbium-doped laser system delivering an optical pulse having a center wavelength characteristic of ytterbium doped gain-media. A length of optical fiber is arranged to receive the optical pulse and spectrally broaden the pulse into a spectral continuum. The spectral continuum characterized as having a first side-lobe having a center wavelength shorter than that of the first optical pulse and a second side-lobe having a center wavelength longer than that of the first optical pulse. A spectrally selective pulse-compressor including a wavelength dispersive device is configured such that the spectrally broadened pulse is received by the wavelength dispersive device. The spectral continuum of the spectrally broadened pulse is spatially spread by the wavelength dispersive device. A portion of the spatially spread continuum spectrum in at least one of the first and second side-lobes thereof is selected and returned to the wavelength dispersive device. The selected side-lobe portion of the spectrum is delivered from the wavelength dispersive device as an output-pulse having a center wavelength within the selected side-lobe portion of the continuum spectrum.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 9 is a graph of intensity as a function of wavelength for long-wavelength and short-wavelength spectral bands selected for pulse compression in the spectrally selective pulse-compressor of FIG. 8.

FIG. 10A is a graph of measured amplitude as a function of time for a pulse resulting from compression of the short-wavelength spectral band of FIG. 9.

FIG. 10B is a graph of measured amplitude as a function of time for a pulse resulting from compression of the long-wavelength spectral band of FIG. 9.

DETAILED DESCRIPTION OF THE INVENTION

Figure 1:
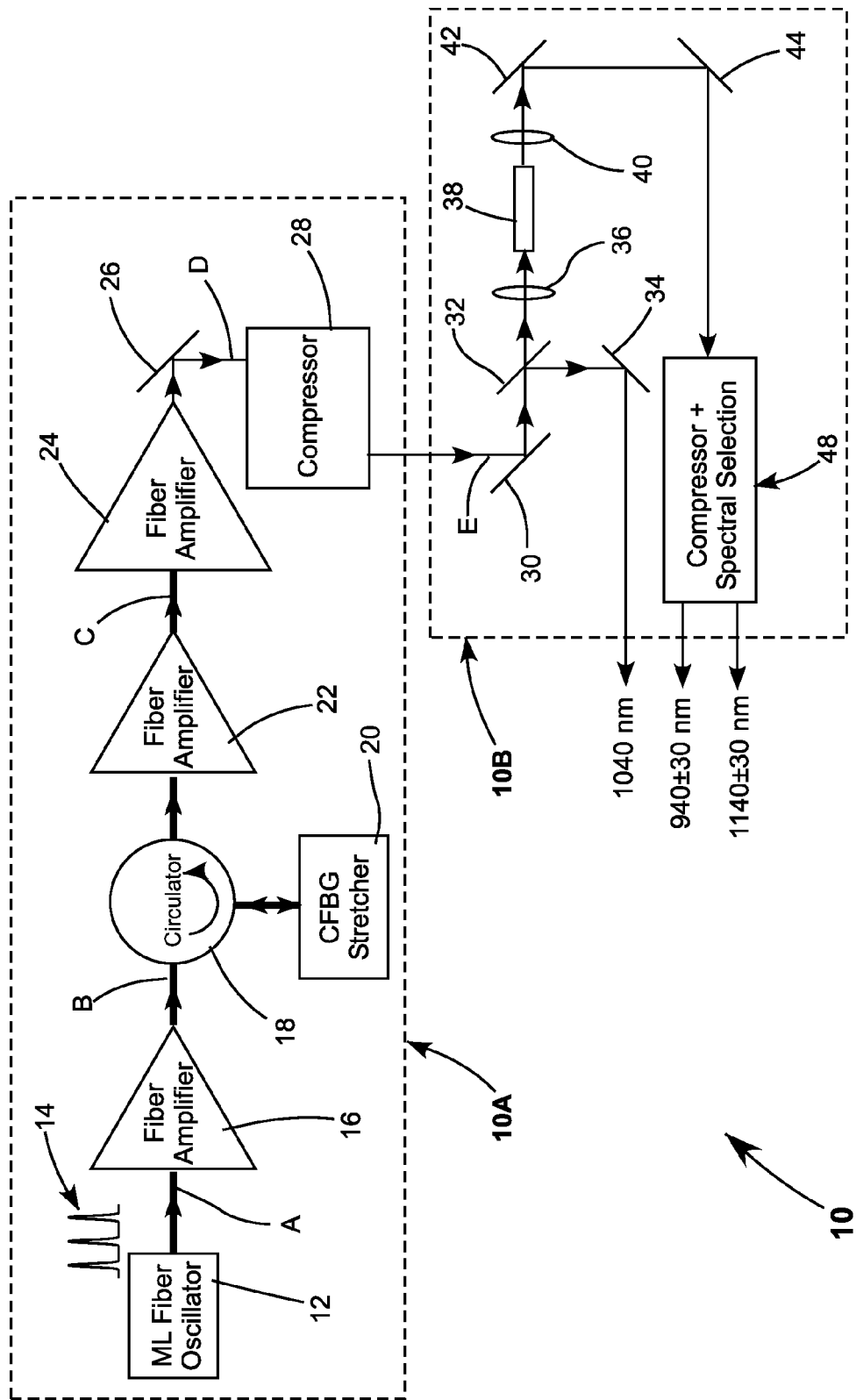
FIG. 1 schematically illustrates a preferred embodiment of a tunable femtosecond pulse-source, including a femtosecond fiber-MOPA cooperative with a continuum-generator and spectrally selective pulse-compressor in accordance with the present invention.

Referring now to the drawings, wherein like components are designated by like reference numerals, FIG. 1 schematically illustrates a preferred embodiment 10 of apparatus providing a femtosecond-pulse-source in accordance with the present invention. Apparatus 10 includes a femtosecond fiber-MOPA 10A, cooperative with a continuum-generator and spectrally selective pulse-compressor 10B in accordance with the present invention.

Spectrally selective pulse-compressor 10B is configured to deliver output-pulses at one or more of NIR wavelengths in response to receiving an input-pulse from fiber-MOPA 10A. One of the pulses has the same center-wavelength as the (fundamental) wavelength of the input-pulses; a second has a center-wavelength shorter than that of the input-pulse; and a third has a wavelength longer than that of the input pulse.

The three pulses can be delivered to a target essentially simultaneously. The term "essentially simultaneously", as used in this description and the appended claims, means, for example, within the response time of a human eye or a CCD. By equalizing the optical paths of the pulses, the pulses can be delivered such that they arrive within the duration of any one pulse.

In FIG. 1, the three pulse-wavelengths are identified as the MPE-useful wavelengths about 1040 nm, about 950 nm, and about 1150 nm discussed above. These wavelengths are exemplified throughout the description of the present invention set forth below.

MOPA 10A includes a mode-locked (ML) fiber-oscillator 12 arranged to deliver a train 14 of single-mode, mode-locked pulses at a pulse-repetition rate (PRF) from a few megahertz (MHz) to about 200 MHz. These pulses are amplified by a first fiber-amplifier 16, and delivered to a circulator 18. Circulator 18 directs the amplified pulses to a chirped fiber-Bragg-grating pulse stretcher 20. In a double pass through pulse-stretcher 18, the duration of the pulses is temporally stretched (hereinafter simply "stretched") to a value about 500 times that of the pulses from oscillator 12.

The stretched pulses return to circulator 18 and are directed by the circulator to a second fiber-amplifier 22. Stretched pulses amplified by fiber-amplifier 22 are further amplified by a third fiber-amplifier 24. Stretched amplified pulses from fiber-amplifier 24 are directed by a turning mirror 26 to a conventional pulse-compressor 28, such as a two-grating pulse-compressor. In pulse-compressor 28, the duration of the pulses is (temporally) compressed to value comparable with that of pulses from oscillator 12, for example between about 40 fs and about 150 fs.

In one example of fiber-MOPA 10A, used for experimental evaluation of apparatus 10 described further herein below, oscillator 12 is a ytterbium-doped fiber-oscillator which delivers pulses at a wavelength of about 1040 nm±5 nm, characteristic of ytterbium doped gain media. The oscillator delivers (at point A in FIG. 1) pulses having a FHWM duration of about 150 fs at a PRF of about 80 MHz. The pulses have spectral bandwidth at FWHM of about 11 nm. The average power of the pulse train is about 2 milliwatts (mW). It should be noted here that all pulse-duration and spectral-bandwidth values referred to herein below are FWHM (full width at half maximum) values unless otherwise stated.

At point B, following amplification in amplifier 16, the pulse-train has an average power of about 16 mW, and the pulse bandwidth has been stretched to about 28 nm. At point C, following amplification in amplifier 22, the pulse-train has an average power of about 300 mW, the pulse bandwidth is about 20 nm, and the pulse-duration is about 100 picoseconds (ps) as a result of the double-pass through pulse-stretcher 20. At point D, following amplification in amplifier 24, the pulse-train has an average power of about 20 Watts (W), the pulse-bandwidth is about 19 nm, and the pulse-duration is about 100 picoseconds (ps). At point E, following passage through pulse-compressor 28, the pulse-duration is reduced to about 100 fs. Peak power of the pulses is about 2 Megawatts (MW) and the pulse-bandwidth is about 19 nm.

It is emphasized here that the configuration of MOPA 10A described above should not be construed as limiting the present invention. Those skilled in the art, from the description provided herein may employ other fiber-MOPA configurations of comparable output characteristics, or bulk solid-state lasers with Yb-doped gain media, without departing from the spirit and scope of the present invention.

Whatever the fiber-MOPA configuration, it is preferable that pulses directed into continuum-generator and spectrally selective pulse-compressor 10B are single-mode pulses have a duration between about 50 fs and about 500 fs, and a peak power between about 0.5 MW and about 5 MW. The pulse-bandwidth is preferably between about 10 nm and about 30 nm, and has spectral intensity distribution approximating a Gaussian or sech-squared function.

Continuing with reference to FIG. 1, continuum-generator and spectrally selective pulse-compressor 10B receives a pulse from fiber-MOPA 10A. The received pulse is directed by a turning mirror 30 to a proportional beam-splitter 32, which reflects a portion of the pulse to turning mirror 34.

Turning mirror 34 directs that pulse-portion out of continuum-generator and spectrally selective pulse-compressor 10B as the fundamental wavelength, (here 1040 nm), one of the three possible output-pulses, with the others at 940 nm and 1140 nm. The reflected pulse-portion is preferably between about 5% and about 20%.

A reason for selecting the fundamental wavelength before a fundamental-wavelength pulse is processed by the continuum-generator and pulse-compressor will be apparent from a description of experimental results presented further herein below. If a fundamental wavelength pulse is not required, beam-splitter 32 can be omitted, thereby increasing the power available for generating the 940-nm and 1140-nm pulses.

A remaining portion of the input pulse is transmitted through beam-splitter 32 and focused by a lens 36 into a continuum-generator 38, which is a short length of optical fiber. The optical fiber can be a straight single-mode optical fiber, a tapered optical fiber, or a structured, void-containing fiber, commonly referred to as a "photonic crystal fiber" (PCF) by practitioners of the art. The bandwidth of the input pulse is spread into a relatively broad, somewhat irregularly spectrally distributed continuum. In terms of the instant 1040 nm fundamental example, preferably the continuum-generator is configured such that the continuum extends from about 900 nm to about 1200 nm.

The generated continuum (continuum-pulse) is collimated by a lens 40 and directed by turning mirrors 42 and 44 into an inventive spectrally selective pulse-compressor 48. Pulse-compressor 48 selects from the input-pulse spectrum, long-wavelength and short-wavelength bands that are delivered as the longer-and-shorter-than-fundamental-wavelength pulses, here at center wavelengths of 1140±30 nm and 940±30 nm respectively. The pulse-duration and center wavelength will depend, inter alia, on the bandwidths selected.

It should be noted here that while the 940-nm, 1040-nm, and 1140-nm pulses are depicted in FIG. 1 as being on separate paths, it is possible to combine the pulses on the same path. This can be done, for example using dichroic mirrors and the like as is known in the art.

Figure 2:
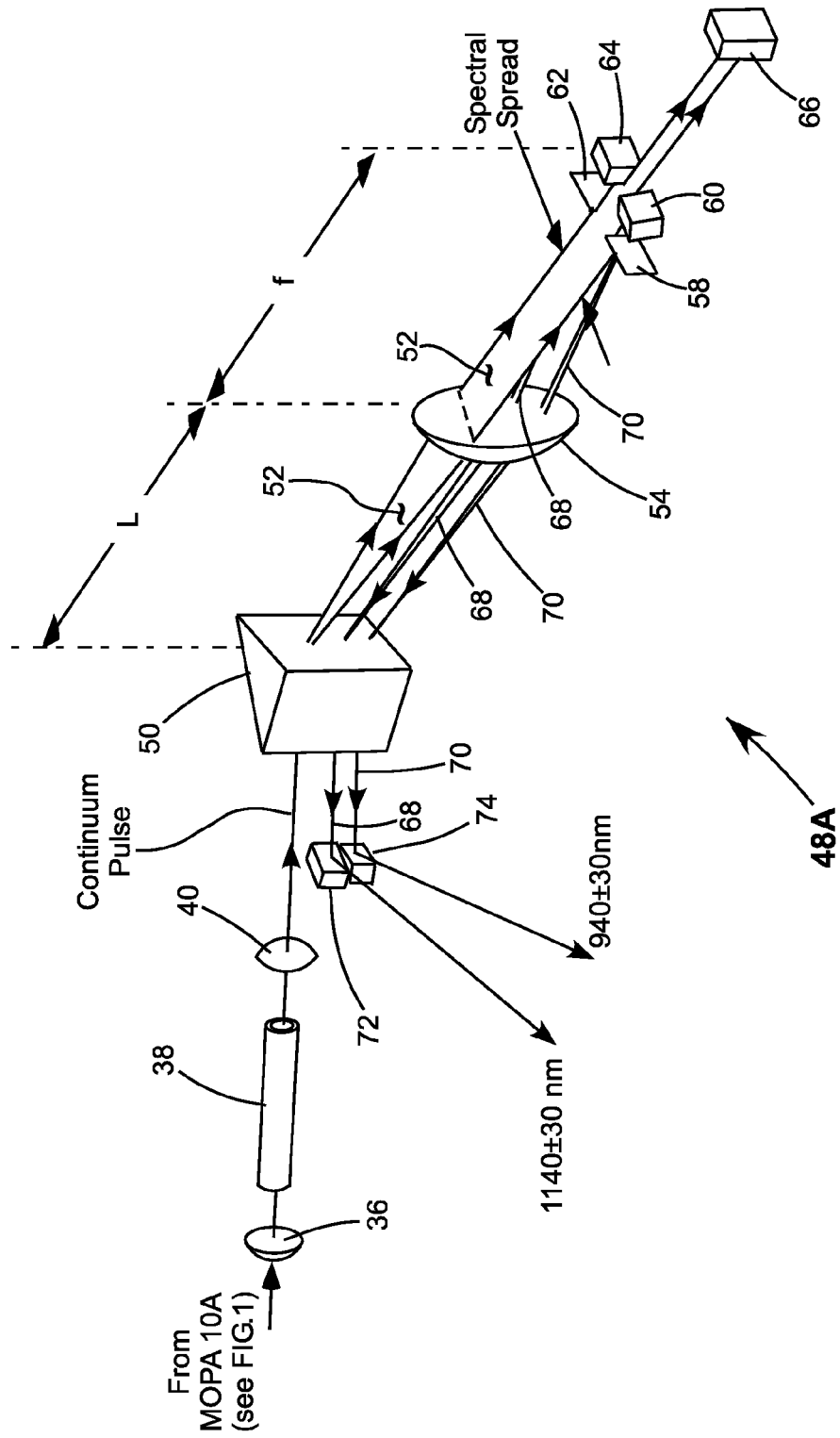
FIG. 2 is a three-dimensional view schematically illustrating one preferred embodiment of the continuum-generator and spectrally selective pulse-compressor of FIG. 1, wherein the spectrally selective pulse-compressor includes a prism and a positive lens used in a double-pass mode for pulse-compression and spectral spreading.

FIG. 2 is a three-dimensional view schematically depicting continuum-generator and spectrally-selective pulse-compressor including one preferred embodiment 48A of the spectrally selective pulse-compressor of FIG. 1. Here the continuum pulse from lens 40 is intercepted by a spectrally dispersive (wavelength dispersive) element in the form of a prism 50. This prism is preferably of a highly dispersive glass, such as SF14. Prism 50 spreads the continuum pulse into spectrum 52 diverging from the prism in what can be considered a continuous sheet of rays.

Spectrum 52 is incident on a positive lens 54 located at a distance L from prism 50 and having a focal length f. Lens 52 essentially collimates the spectrum, as indicated in the drawing. The collimated spectrum has a spectral-spread width dependent on the continuum-pulse spectrum, the dispersion of the prism, and the distance of lens 54 from the prism. By way of example, for a continuum pulse spectrum ranging from about 900 nm to about 1200 nm; a SF14 Prism; and f equal to 150 mm, the spectral spread will be about 2.0 mm.

Aperture stops 58 and 62 intrude into the collimated spectrum on respectively the short-wavelength and long-wavelength sides thereof. This somewhat narrows the spectrum. Tilted mirrors 60 and 64 intrude into the narrowed portion of the spectrum on respectively the short and long wavelength sides thereof. The central portion of the spectrum around the fundamental wavelength passes between mirrors 60 and 64 and is absorbed by a beam-dump or beam-trap 66. It should be noted here, that in this example, the stops and mirrors are located at about a focal length (f) from lens 54.

As depicted in FIG. 2, the combination of stop 62 and mirror 64 form a spectrally-selective aperture stop which selects a long-wavelength portion of spectrum 52. The long-wavelength edge of this selected portion is determined by the intruding edge of stop 62 and the short-wavelength edge of the selected portion is determined by the intruding edge of mirror 64. Similarly the combination of stop 58 and mirror 60 form a spectrally-selective aperture stop which selects a short-wavelength portion of spectrum 52. In this case, the intruding edges of stop 58 and mirror 60 define respectively the short-wavelength and long-wavelength edges wavelength of the selected spectral portion.

The selected long-wavelength portion 68 of spectrum 52 is reflected by mirror 64 back to lens 54 at an angle to the incident spectrum. The selected short-wavelength portion 70 of spectrum 52 is reflected by mirror 64 back to lens 54 at an angle to the incident spectrum steeper than that of reflected portion 68. Lens 54 transmits spectral portions, with each converging, to prism 50. Spectral portions 68 and 70 are transmitted by prism 50 with about the same dimensions as the incident continuum-pulse beam from lens 40, and with all spectral components thereof traveling along essentially the same path. These spectral portions are directed by mirrors 72 and 74 to provide long-wavelength and short-wavelength pulse outputs, here, at 1140±30 nm and 940±30 nm respectively.

Figure 3:
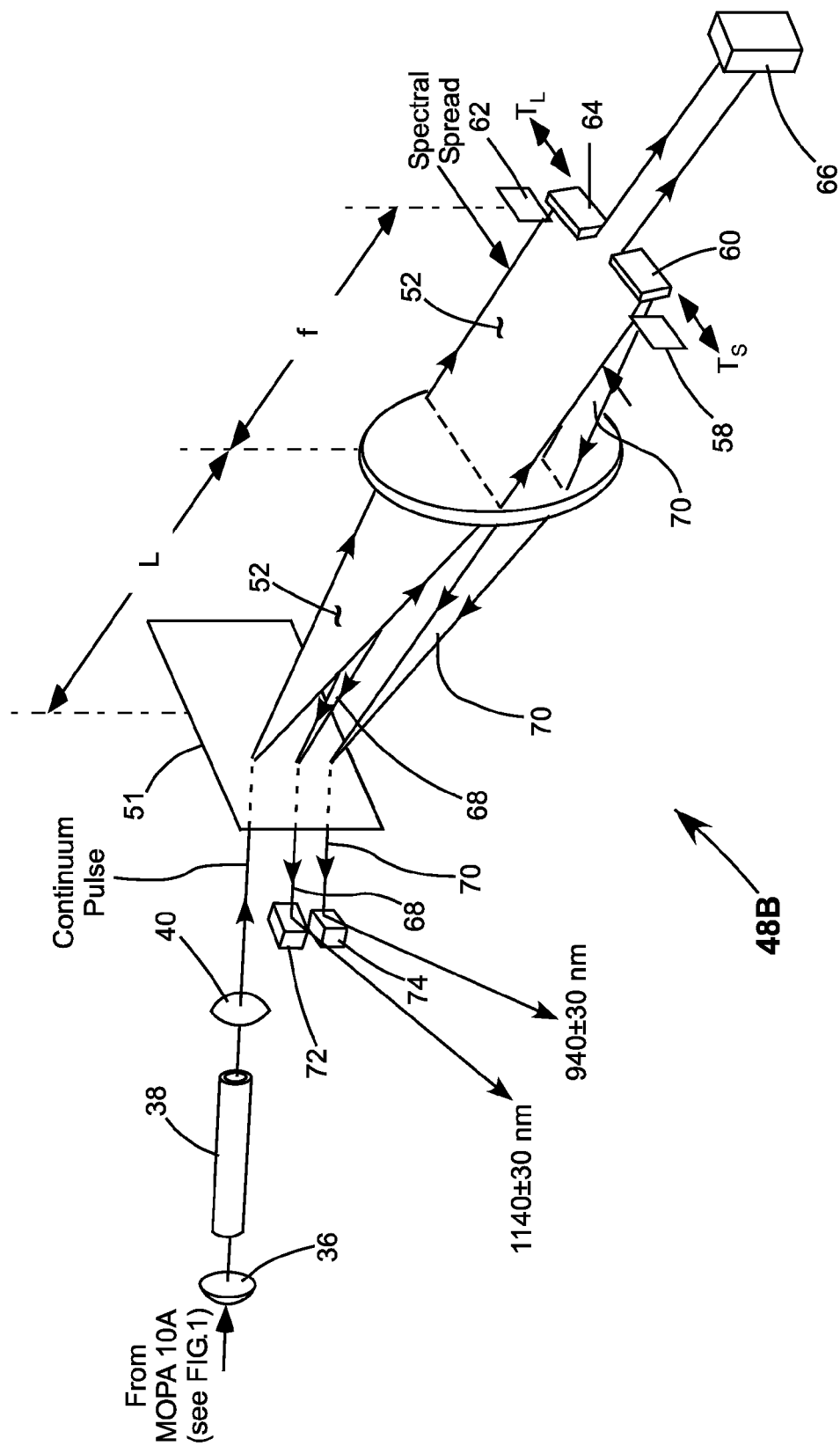
FIG. 3 is a three-dimensional view schematically illustrating another preferred embodiment of the continuum-generator and spectrally selective pulse-compressor of FIG. 1, wherein the spectrally selective pulse-compressor includes a transmission grating and a positive lens used in a double-pass mode for pulse-compression and spectral spreading.

FIG. 3 is a three-dimensional view schematically depicting continuum-generator and spectrally-selective pulse-compressor including another preferred embodiment 48B of the spectrally selective pulse-compressor of FIG. 1. This embodiment is similar to the embodiment of FIG. 2 with an exception that prism 50 of embodiment 48A is replaced in embodiment 48B by a transmission grating 51. With an input spectrum of 900 nm to 1200 nm; distance L equal to 200 nm; and grating 51 having a 1000 lines per millimeter, the spectral spread at the reflective aperture-stops will be about 3.5 mm, i.e., almost twice that of the embodiment of FIG. 2, all else being equal. This wider spread improves the accuracy of spectral selection, but is achieved at a lesser, but tolerable, transmission efficiency than is achieved with the prism of embodiment 48A.

It should be noted that in either embodiment of the inventive spectrally selective pulse-compressor, pulse compression can only be achieved, when distance L is greater than focal length F. By way of example, if distance L is the above-exemplified 200 mm, focal length f is preferably about 150 mm. The degree of compression for any selected spectral portion will be determined, inter alia, by the difference between L and f, and the spectral width of a selected spectral portion. An exemplary quantification of this is provided further herein below.

Further, in either embodiment of the inventive spectrally selective pulse-compressor, stops 58 and 62 may be omitted and spectral selection made by mirrors 60 and 64 alone. The mirrors may intrude only partially into spectrum 52, such that the long-wavelength edge of the long-wavelength spectral portion is the long wavelength edge of spectrum 62; and the short-wavelength edge of the short-wavelength spectral is the short-wavelength edge of spectrum 52. Other methods of reflective or transmissive selection of spectral portions of the continuum spectrum, such as dichroic mirrors, may be used without departing from the spirit and scope of the present invention.

Alternatively, mirrors 60 and 64 may intrude completely into spectrum 52, with the width of the mirrors determining the bandwidth of the selected spectral portions, and the lateral position of the mirrors determining the center-wavelength of the selected spectral portions. In this case, provision should be made to trap long and short wavelengths of spectrum 52 which bypass respectively mirrors 64 and 60. Limited tunability of the center wavelength of the spectral portions (the extent dependent on the spectral shape of 52) can be achieved by adjusting the lateral position of the mirrors as indicated by arrows $T_L$ and $T_S$ in FIG. 3.

Figure 4:
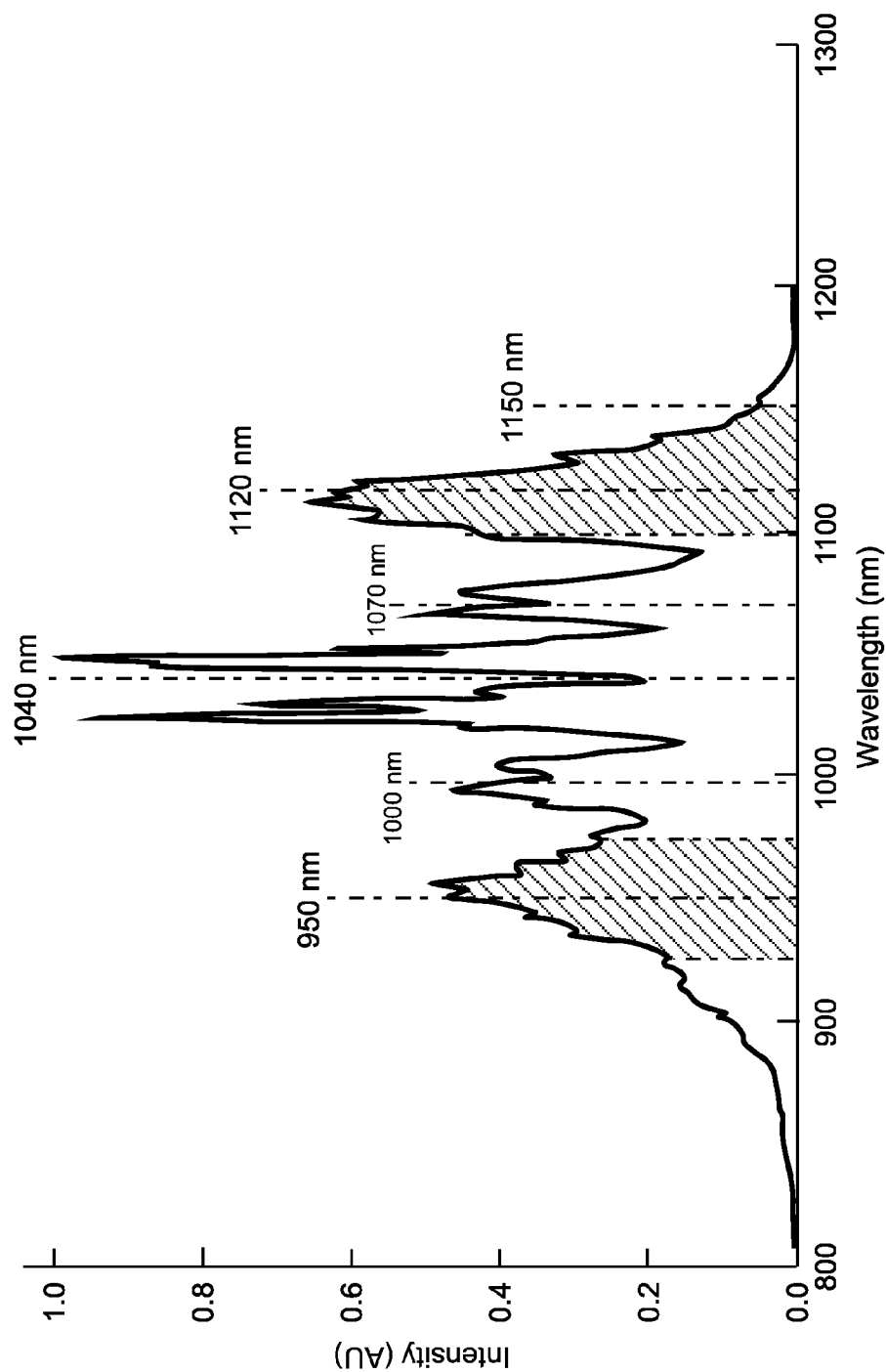
FIG. 4 is a graph schematically illustrating a spectrum of a pulse-continuum generated in one example of the continuum-generator and pulse-compressor of FIG. 3 generated from an input-pulse from the fiber-MOPA, with the spectrum having side-lobes at wavelengths on short-wavelength and long-wavelength sides of the wavelength of the input-pulse.

FIG. 4 is a graph schematically illustrating measured intensity as a function of wavelength (spectrum) of a continuum-pulse obtained from an experimental version of the apparatus of FIG. 3, with a grating used as a dispersive element. This continuum-pulse was generated in a conventional single mode fiber having a core-diameter of 6 micrometers (μm) and a length of 15 mm. Average power of pulses input to fiber 38 was 9 W for an average power of 5.8 W for continuum pulses out of the fiber. The PRF was 80 MHz. The input pulse-duration was 100 fs; the input pulse wavelength was 1040 nm; and the input pulse bandwidth was about 20 nm. It can be seen that spectrum exhibits a plurality of side-lobes with center wavelengths shorter and longer than the 1040 nm of the input pulse. The side-lobes are particularly well-defined at the extremities of the spectrum. Here, side-lobes at the short-wavelength and long-wavelength extremities of the spectrum are centered at about 950 nm and about 1120 nm respectively.

The spectrum is roughly shape-symmetrical about the 1040-nm input wavelength. The shaded areas of the 950-nm and 1120 nm side-lobes are 50 nm wide, indicating a spectral width to be selected by the reflective apertures for compression. Measured power in the shaded portion of each side-lobe was about 1 W. Limited tunability of the center wavelength of the side-lobes can be achieved by varying pulse power input to continuum generating fiber 38. All (100%) or some lesser portion of a side-lobe may be selected for forming an output-pulse. This is discussed in detail, with examples, further herein below.

It is also possible to select 100% or some lesser portion of other side-lobes. By way of example all or some portion of the side-lobes centered at wavelengths of 1000 nm and 1070 nm could be selected. Indeed, any combination of long-wavelength or short-wavelength side-lobes may be selected.

Figure 5:
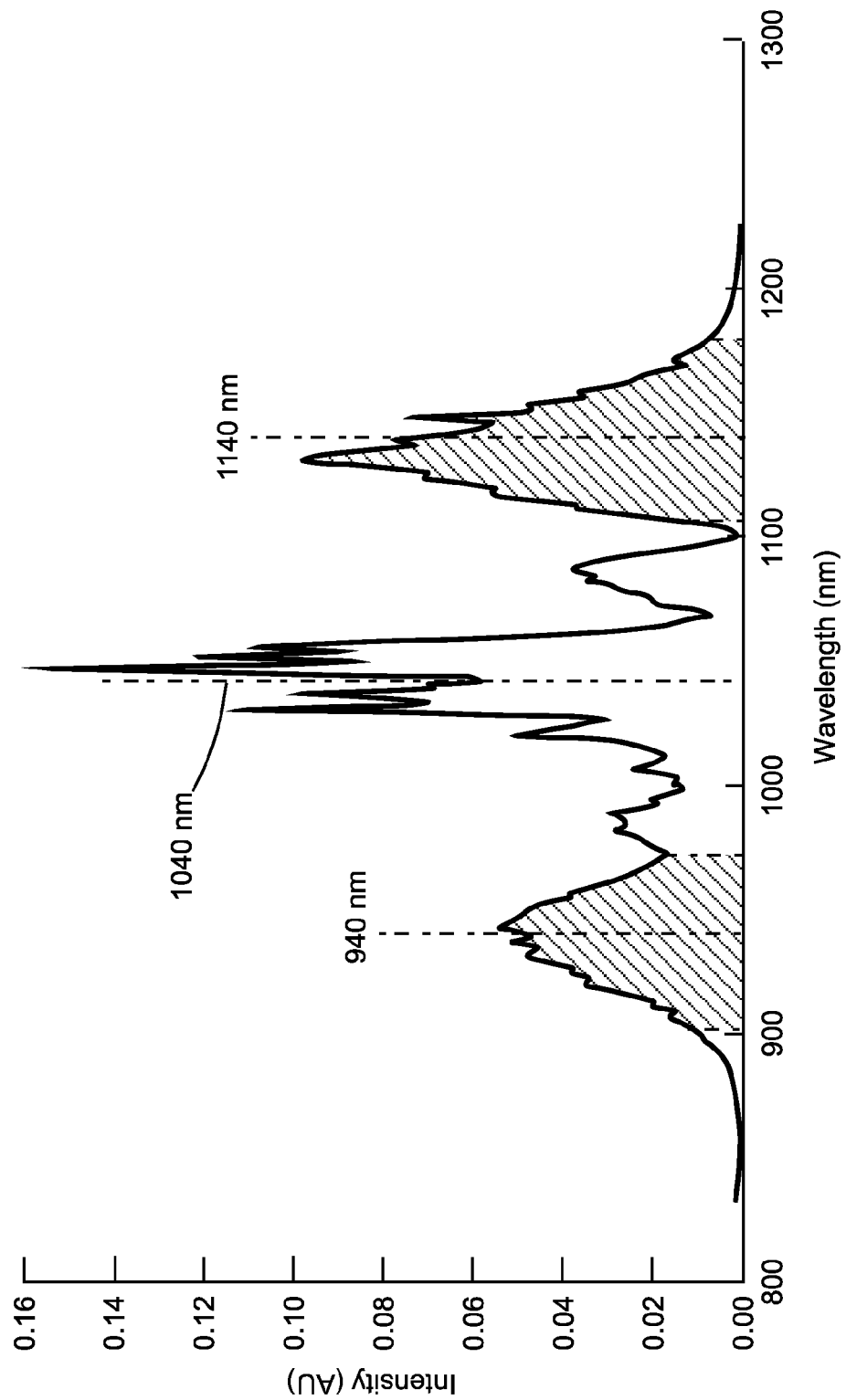
FIG. 5 is a graph schematically illustrating a spectrum of a pulse-continuum generated in another example of the continuum-generator and pulse-compressor of FIG. 3 from an input-pulse from the fiber-MOPA, with the spectrum having side-lobes at wavelengths on short-wavelength and long-wavelength sides of the wavelength of the input-pulse.

FIG. 5 is a graph schematically illustrating measured intensity as a function of wavelength (spectrum) of a continuum-pulse obtained from an experimental version of the apparatus of FIG. 3, again with a grating used as a dispersive element. This continuum-pulse was generated in a photonic crystal fiber with a core-diameter of 8 micrometers (μm) and a length of about 15 mm. The fiber was a type LMA8 available from NKT Photonics S/A, of Birkerød, Denmark. Average power of pulses input to fiber 38 was 7 W, for an average power of 6 W for continuum-pulses out of the fiber. The PRF was 80 MHz. The input pulse-duration was 100 fs; the input pulse wavelength was 1040 nm; and the input pulse bandwidth was about 20 nm.

It can be seen that the short-wavelength and long-wavelength side-lobes of the continuum spectrum are better defined that than those of the example of FIG. 4 with the long wavelength side-lobe being centered closer to 1140 nm. The short-wavelength side-lobe is centered at about 945 nm. The shaded areas of the side-lobes are 70 nm wide. Measured power in the shaded portion of the long-wavelength and short-wavelength side-lobes was 1.9 W and 1.3 W respectively, i.e., more than half of the total power in the continuum-pulse is in the useable side-lobes.

Here again, it should be noted that other long-wavelength or short-wavelength side-lobes are available for selection, albeit with lesser power. In general, for any type and length of continuum-forming fiber, the number of side-lobes in continuum-spectra such as those of FIGS. 4 and 5 will increase as the power of the input-pulse to the fiber is increased. Some, however, may have too narrow a bandwidth to be of practical value.

Figure 6:
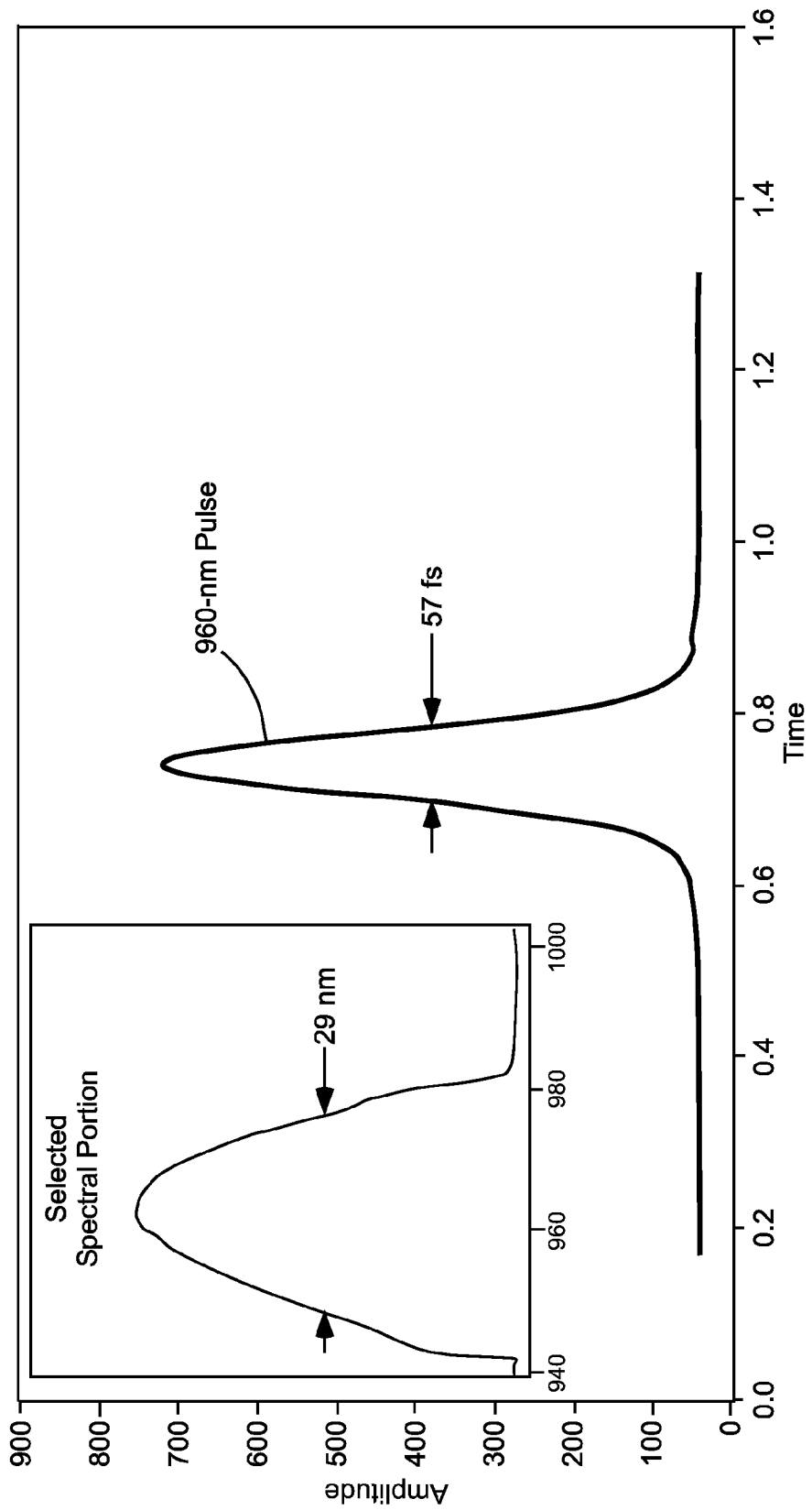
FIG. 6 is an autocorrelation-trace (measured) of an output-pulse having a spectral portion selected from the short-wavelength side-lobe of the spectrum of FIG. 6 with the selected spectrum depicted in an inset.

FIG. 6 is a reproduction of an oscilloscope-displayed autocorrelation-trace of a pulse formed by selecting 29 nm of the 950 nm side-lobe of the spectrum of FIG. 5 after compression in the spectrally selective pulse-compressor. The pulse has a duration of about 57 fs and is essentially bandwidth limited. An inset in FIG. 6 depicts the form of the 29-nm selected side-lobe spectrum, centered at a wavelength of about 960 nm.

It can be seen in both FIG. 4 and FIG. 5 that around the fundamental wavelength (1040 nm) of the stretched pulse, in a spectral width comparable to that of the side-lobes the continuum spectrum is highly irregular, and actually has a minimum at the center wavelength. This region could not be compressed to provide an MPE-useful pulse. It is for this reason that if a 1040 nm pulse is required, it is sampled from the input pulse from the MOPA as depicted in FIG. 1.

Figure 7:
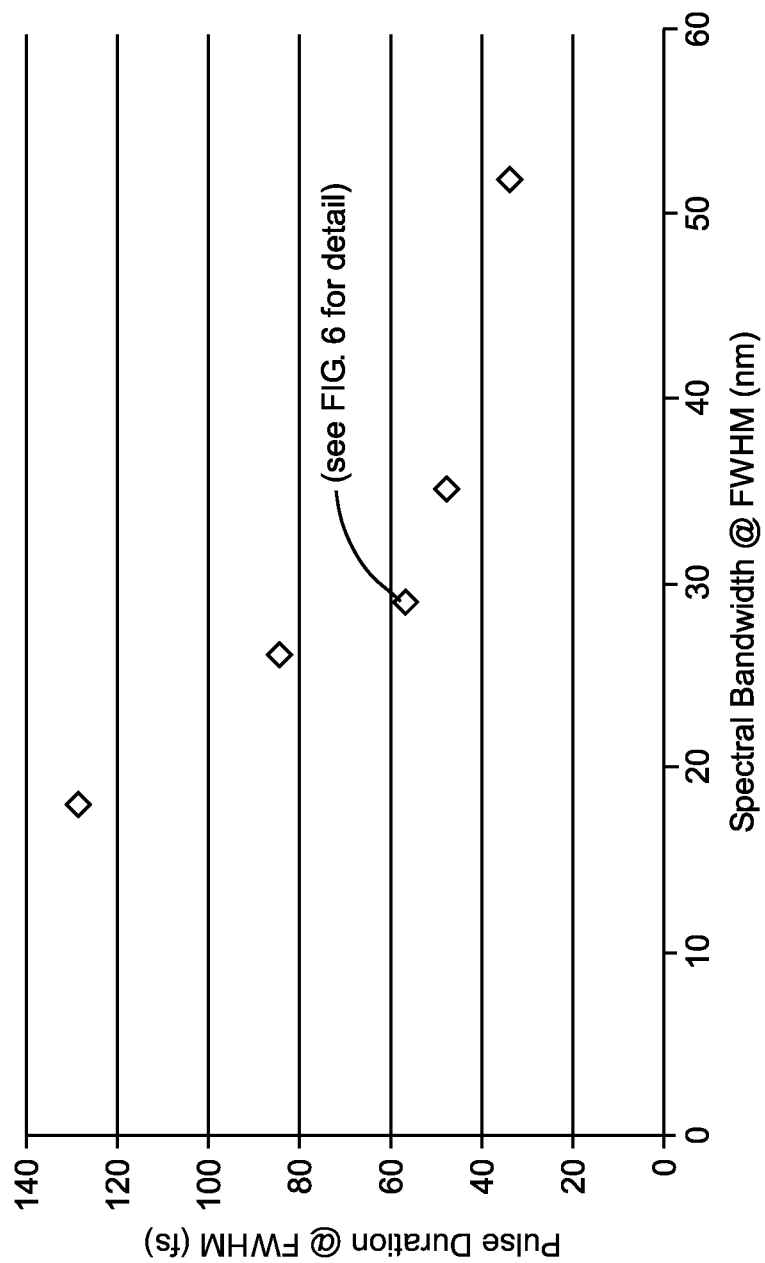
FIG. 7 is graph schematically illustrating pulse-duration as a function of spectral bandwidth for output-pulses generated from the short-wavelength side-lobe of continuum-pulses generated in an example the continuum-generator and spectrally selective pulse-compressor of FIG. 3.

FIG. 7 is a graph schematically illustrating measured pulse-duration as a function of spectral bandwidth for 960 nm pulses selected and compressed from a continuum generated in a PCF similar to that which generated the continuum of FIG. 5. The input pulse in each case has a duration of 100 fs. Note that the spectral bandwidth, here, is the FWHM bandwidth, which is less than the total width of the continuum portion selected by the short-wavelength reflective aperture of the inventive continuum-generator and pulse-compressor.

The measurement corresponding to the autocorrelation trace and spectrum of FIG. 6 is indicated. Further, it should be noted that while there is an output pulse having a longer duration (130 fs) than that of the input pulse, the output pulse actually results from compressing the selected spectral portion. It is simply that this selected portion is too narrow for compression below the 100 fs of the input pulse.

Figure 8:
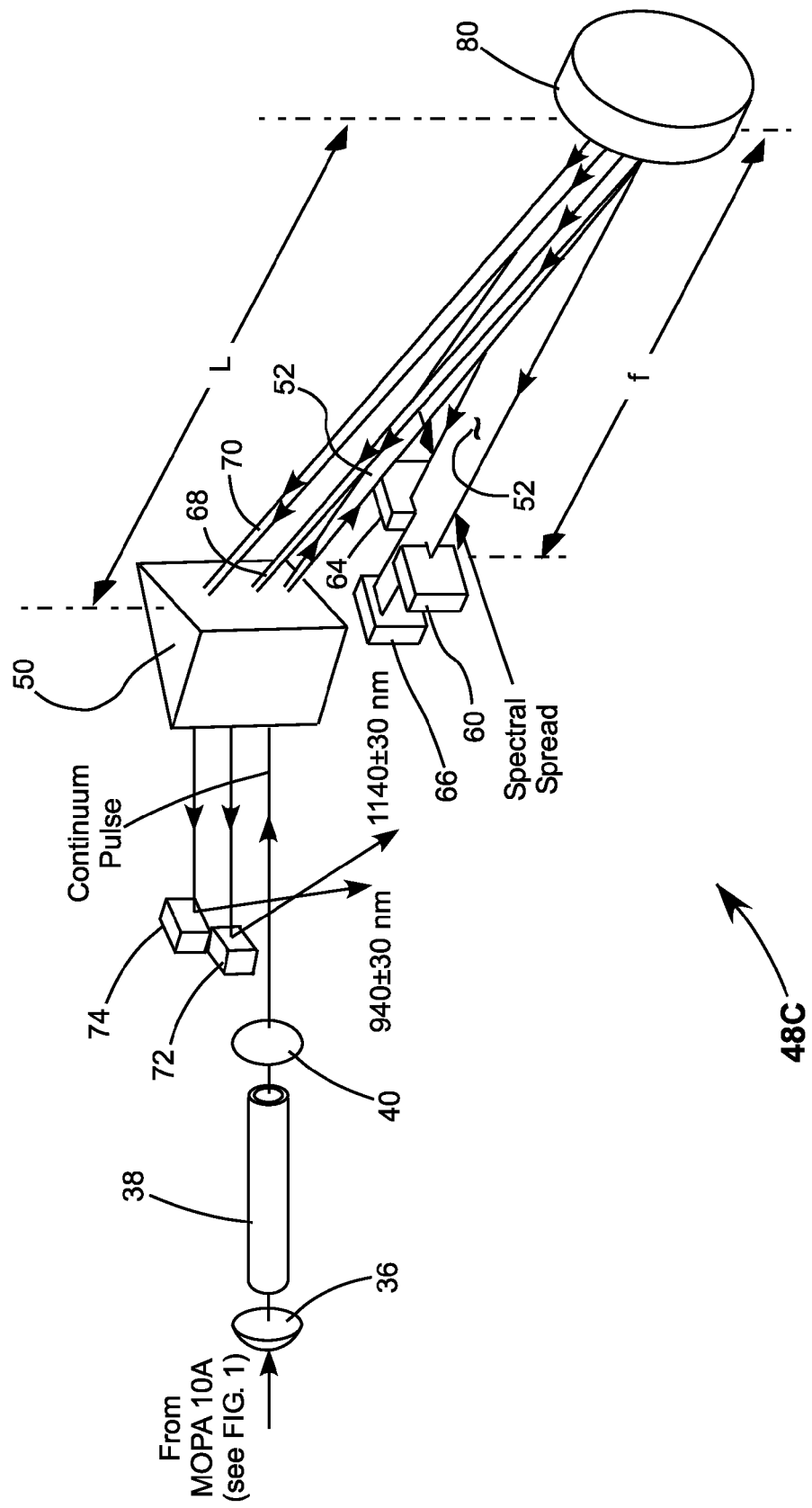
FIG. 8 is a three dimensional view schematically illustrating yet another preferred embodiment of the continuum-generator and spectrally selective pulse-compressor of FIG. 1, wherein the spectrally selective pulse-compressor includes a prism and a concave mirror used in a double-pass mode for pulse-compression and spectral spreading.

FIG. 8 is a three dimensional view schematically illustrating yet another preferred embodiment 48C of the continuum-generator and spectrally selective pulse-compressor of FIG. 1. Embodiment 48C is similar to embodiment 48A of FIG. 2 with an exception that a concave mirror 80 is used in place of lens 54 of embodiment 48A. Further, stops 58 and 62 of embodiment 48A ore omitted. The arrangement of FIG. 8 enables distance L to be extended without extending the physical path-length. A distance L of 350 mm provides a spectral spread at the reflective apertures of about 4 mm, i.e., greater than the spectral spread in the grating embodiment (48B) of FIG. 3. A suitable focal length for mirror 80 is about 300 mm.

FIG. 9 is a graph schematically illustrating long-wavelength and short-wavelength spectral portions selected from a continuum spectrum in the example of FIG. 8. Properties of the input-pulse are as specified above for other examples. FIG. 10A and FIG. 10B are reproductions of autocorrelation traces of output-pulses generated by compressing respectively the short-wavelength and long-wavelength spectral portions of FIG. 9 by the reverse pass through the prism of FIG. 8. Note the correspondence of the selected spectral bandwidth (30 nm) and the pulse duration (57 fs) of the long-wavelength pulse with the 960-nm pulse example of FIG. 6.

As discussed above in a spectrally selective pulse-compressor in accordance with the present invention compression of a selected portion of the input pulse spectrum (to an extent dependent of the selected bandwidth) only occurs when the distance (L) from the dispersive device (prism or grating) is greater than the focal length (f) of the collimating element (lens or mirror). More generally it can be stated that negative group delay dispersion (negative GDD) will only be applied when L is greater than F. This is quantified below with reference to FIG. 11 and FIG. 12.

Figure 11:
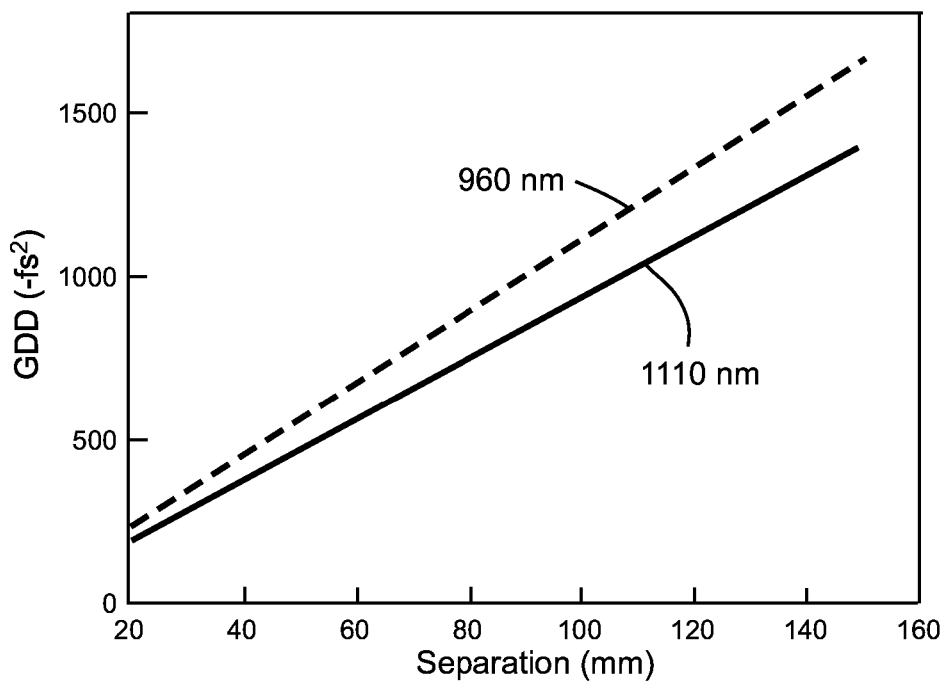
FIG. 11 is a graph of calculated group delay dispersion (GDD) as a function of separation of the mirror and the prism in the spectrally selective pulse-compressor of FIG. 8.

FIG. 11 is a graph schematically illustrating the calculated group-delay dispersion (GDD) introduced by the spectrally selective pulse-compressor as a function of "separation", i.e., L-f in the embodiment of FIG. 8. Plots are shown for wavelengths 960 nm and 1110 nm.

Figure 12:
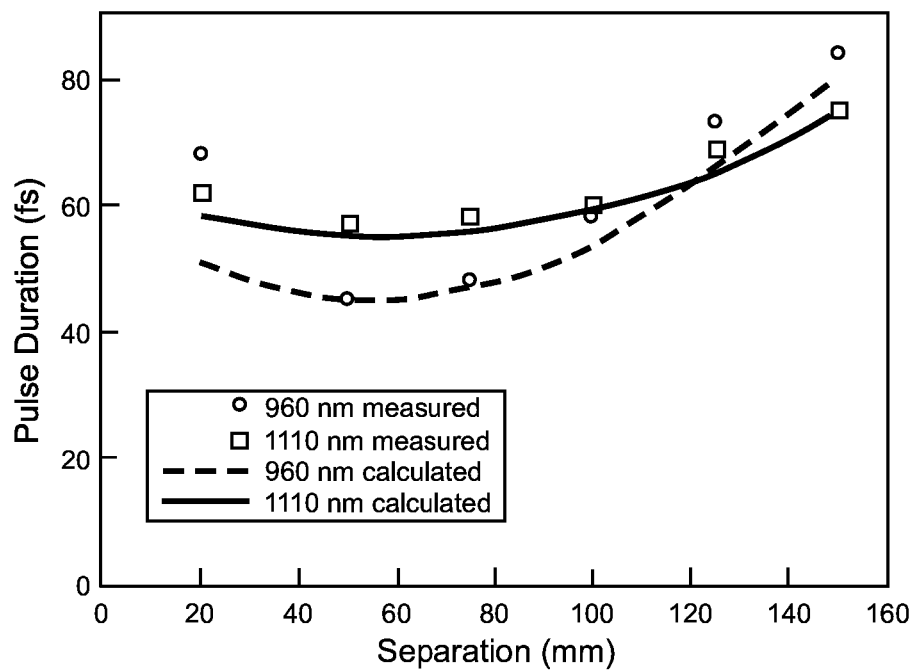
FIG. 12 is a graph of measured and calculated pulse duration as a function of separation of the mirror and the prism in the spectrally selective pulse-compressor of FIG. 8.

FIG. 12 is a graph schematically illustrating measured (plot points) and calculated (curves) of pulse duration as a function of separation (L-f) for the 960-nm and 1110-nm wavelengths. It can be seen that there is an optimum separation in a range between about 20 mm and about 100 mm for each pulse-wavelength. This allows a GDD between about −200 femtoseconds-squared ($fs^2$) and about −1000 $fs^2$ to be selected, while still being in the optimum separation range from the pulse-duration point of view. This provides that a negative GDD can be selected to leave a "negative chirp" in the output-pulse to pre-compensate the pulse for positive GDD (pulse stretching) that might be applied to the pulse in an optical system, such as a microscope, in which the pulse will be used.

The present invention is described above with reference to a preferred and other embodiments. The invention, however, is not limited to the embodiments described and depicted herein. Rather the invention is limited only to the claims appended hereto.

What is claimed is:

1. Optical apparatus comprising;
 a mode-locked ytterbium-doped laser system delivering an optical pulse having a center wavelength characteristic of ytterbium doped gain-media;
 a length of optical fiber arranged to receive the optical pulse and spectrally broaden the pulse into a spectral continuum, the spectral continuum characterized as having at a first side-lobe having a center wavelength shorter than that of the optical pulse and a second side-lobe having a center wavelength longer than that of the optical pulse;
 a spectrally selective pulse-compressor including a wavelength dispersive device;
 the spectrally selective pulse-compressor being configured such that the spectrally broadened pulse is received by the wavelength dispersive device, the spectral continuum of the spectrally broadened pulse is spatially spread by the wavelength dispersive device, a portion of the spatially spread spectral continuum in at least one of the first and second side-lobes thereof is selected and returned by a reflective optic to the wavelength dispersive device, and the selected side-lobe portion of the spectral continuum is delivered from the wavelength dispersive device as an output-pulse having a center wavelength within the selected side-lobe portion of the spectral continuum and wherein the selected side-lobe portion of the spectral continuum is compressed before being delivered from the wavelength dispersive device.

2. The apparatus of claim 1, wherein the first and second side-lobes are at respectively short-wavelength and long-wavelength extremities of the spectral continuum.

3. The apparatus of claim 2, wherein a portion of each of the first and second side-lobes is selected from the spectral continuum, and the selected side-lobe portions are directed along separate paths to and from the wavelength dispersive device to provide first and second output-pulses.

4. The apparatus of claim 3, wherein the center wavelength of the optical pulse from the ytterbium-doped laser system is about 1040 nanometers, the first selected side lobe portion has a center wavelength of about 940 nanometers, and the second selected side lobe portion has a center wavelength of about 1140 nanometers.

5. The apparatus of claim 1, wherein the wavelength dispersive device is a prism.

6. The apparatus of claim 1, wherein the wavelength dispersive device is a transmission grating.

7. Optical apparatus comprising;
 a mode-locked ytterbium-doped fiber MOPA delivering an optical pulse having a center wavelength of about 1040 nanometers;
 a length of optical fiber arranged to receive the optical pulse and spectrally broaden the pulse into a spectral continuum, the spectral continuum characterized as having at a first side-lobe having a center wavelength shorter than 1040 nanometers and a second side-lobe having a center wavelength longer than 1040 nanometers
 a spectrally selective pulse-compressor including a wavelength dispersive device and a positive lens spaced at a distance L from the wavelength dispersive device and having a focal length f, where f is less than L;
 the spectrally selective pulse-compressor being configured such that the spectrally broadened pulse is received by the wavelength dispersive device, the spectral continuum of the spectrally broadened pulse is spatially spread in a diverging sheet of rays by the wavelength dispersive device, the diverging sheet of rays is formed into a collimated sheet of rays by the positive lens, a portion of the spatially spread spectral continuum in at least one of the first and second side-lobes thereof is selected from the collimated sheet of rays and returned by a reflective optic via the positive lens to the wavelength dispersive device, and the selected side-lobe portion of the spectral continuum is delivered from the wavelength dispersive device as an output-pulse having a center wavelength within the selected side-lobe portion of the spectral continuum.

8. The apparatus of claim 7, wherein the wavelength dispersive device is a prism.

9. The apparatus of claim 7, wherein the wavelength dispersive device is a transmission grating.

10. The apparatus of claim 1, wherein the difference between L and f is selected to apply a predetermined negative group delay dispersion to the selected side-lobe portion of the spectral continuum.

11. The apparatus of claim 10, wherein the negative group-delay dispersion is between about 200 femtoseconds-squared and about 1000 femtoseconds-squared.

12. The apparatus of claim 7, wherein the first and second side-lobes are at respectively short-wavelength and long-wavelength extremities of the spectral continuum.

13. The apparatus of claim 12, wherein a portion of each of the first and second side-lobes is selected from the spectral continuum, and the selected side-lobe portions are directed along separate paths to and from the wavelength dispersive device to provide first and second output-pulses.

14. The apparatus of claim 13, wherein the center wavelength of the optical pulse from the ytterbium-doped laser system is about 1040 nanometers, the first output-pulse has a center wavelength of about 940 nanometers, and the second output-pulse has a center wavelength of about 1140 nanometers.

15. Optical apparatus comprising;
a mode-locked ytterbium-doped fiber MOPA delivering an optical pulse having a center wavelength of about 1040 nanometers;
a length of optical fiber arranged to receive the optical pulse and spectrally broaden the pulse into a spectral continuum, the spectral continuum characterized as having at a first side-lobe having a center wavelength shorter than 1040 nanometers and a second side-lobe having a center wavelength longer than 1040 nanometers
a spectrally selective pulse-compressor including a wavelength dispersive device and a concave mirror spaced at a distance L from the wavelength dispersive device and having a focal length f, where f is less than L;
the spectrally selective pulse-compressor being configured such that the spectrally broadened pulse is received by the wavelength dispersive device, the spectral continuum of the spectrally broadened pulse is spatially spread in a diverging sheet of rays by the wavelength dispersive device, the diverging sheet of rays is formed into a collimated sheet of rays by the concave mirror, a portion of the spatially spread spectral continuum in at least one of the first and second side-lobes thereof is selected from the collimated sheet of rays and returned via the concave mirror to the wavelength dispersive device, and the selected side-lobe portion of the spectral continuum is delivered from the wavelength dispersive device as an output-pulse having a center wavelength within the selected side-lobe portion of the spectral continuum.

16. The apparatus of claim 15, wherein the wavelength dispersive device is a prism.

17. The apparatus of claim 15, wherein the wavelength dispersive device is a transmission grating.

18. The apparatus of claim 15, wherein the difference between L and f is selected to apply a predetermined negative group delay dispersion to the selected side-lobe portion of the spectral continuum.

19. The apparatus of claim 18, wherein the negative group-delay dispersion is between about 200 femtoseconds-squared and about 1000 femtoseconds-squared.

* * * * *